United States Patent
Tomiyama et al.

(10) Patent No.: US 9,551,144 B2
(45) Date of Patent: Jan. 24, 2017

(54) SOUND ABSORBING COVER, SOUND ABSORBING ASSEMBLY, AND MAGNETIC INDUCTION FOAM MOLDING DEVICE

(71) Applicant: SUMITOMO RIKO COMPANY LIMITED, Komaki-shi, Aichi-ken (JP)

(72) Inventors: Koji Tomiyama, Aisai (JP); Ryosuke Kutsuna, Nishio (JP); Akio Yabu, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 0 days.

(21) Appl. No.: 14/637,048

(22) Filed: Mar. 3, 2015

(65) Prior Publication Data

US 2015/0197933 A1 Jul. 16, 2015

Related U.S. Application Data

(63) Continuation of application No. PCT/JP2014/071126, filed on Aug. 9, 2014.

(30) Foreign Application Priority Data

Sep. 30, 2013 (JP) .................................. 2013-203417

(51) Int. Cl.
*E04B 1/86* (2006.01)
*E04B 1/84* (2006.01)
(Continued)

(52) U.S. Cl.
CPC ................. *E04B 1/84* (2013.01); *B29C 33/06* (2013.01); *B29C 39/02* (2013.01); *B29C 39/26* (2013.01);
(Continued)

(58) Field of Classification Search
CPC ........................................................ E04B 1/86
(Continued)

(56) References Cited

U.S. PATENT DOCUMENTS 3,243,374 A * 3/1966 Gillard ..................... C08K 3/24
181/286
4,308,155 A * 12/1981 Tada ........................ H01F 1/117
106/459

(Continued)

FOREIGN PATENT DOCUMENTS

JP 3514358 B2 3/2004
JP 2004175926 A 6/2004

(Continued)

OTHER PUBLICATIONS

Oct. 7, 2014 International Search Report issued in International Application No. PCT/JP2014/071126.

(Continued)

*Primary Examiner* — Forrest M Phillips
(74) *Attorney, Agent, or Firm* — Oliff PLC

(57) ABSTRACT

A sound absorbing cover is made of foam containing magnetic filler and is integrally molded in a three-dimensional shape so as to cover at least a part of a mating member that is a noise source. The sound absorbing cover includes side walls that cover side surfaces of the mating member and a bottom wall that covers a bottom surface of the mating member that intersects with the side surfaces of the mating member. The magnetic filler is oriented in a thickness direction of each of the side walls and the bottom wall. A sound absorbing assembly includes the sound absorbing cover and a fixing cover that is attached to the outer peripheral surface of the sound absorbing cover and that (Continued)

fixes, to a base, the sound absorbing cover and the mating member that is a noise source covered by the sound absorbing cover.

6 Claims, 10 Drawing Sheets

(51) Int. Cl.
*B29C 39/02* (2006.01)
*B29C 39/26* (2006.01)
*B29C 44/12* (2006.01)
*B29C 33/06* (2006.01)
*G10K 11/162* (2006.01)
*B29C 70/58* (2006.01)
*F02B 77/13* (2006.01)
*E04B 1/82* (2006.01)
*B60R 13/08* (2006.01)

(52) U.S. Cl.
CPC ............ *B29C 44/12* (2013.01); *G10K 11/162* (2013.01); *B29C 70/58* (2013.01); *B29K 2995/0008* (2013.01); *B60R 13/08* (2013.01); *E04B 2001/8245* (2013.01); *F02B 77/13* (2013.01)

(58) Field of Classification Search
USPC ........................................................ 181/290
See application file for complete search history.

(56) References Cited

U.S. PATENT DOCUMENTS

| | | | | |
|---|---|---|---|---|
| 4,474,676 A | * | 10/1984 | Ishino | ................ C08K 3/08 |
| | | | | 174/391 |
| 4,735,284 A | * | 4/1988 | Gahlau | ................ B32B 7/06 |
| | | | | 181/204 |
| 4,833,018 A | * | 5/1989 | Ruehl | ................ B32B 11/08 |
| | | | | 428/332 |
| 6,706,206 B1 | * | 3/2004 | Aichele | ................ H01F 1/26 |
| | | | | 252/62.54 |
| 6,875,066 B2 | * | 4/2005 | Wolaver | ................ F01N 1/24 |
| | | | | 181/204 |
| 7,261,834 B2 | * | 8/2007 | Fuchs | ................ F16F 1/3605 |
| | | | | 252/62.53 |
| 2004/0102597 A1 | | 5/2004 | Tobita et al. | |
| 2010/0224438 A1 | * | 9/2010 | Schulze | ................ G10K 11/168 |
| | | | | 181/204 |

FOREIGN PATENT DOCUMENTS

| | | |
|---|---|---|
| JP | 2009196101 A | 9/2009 |
| JP | 2009235979 A | 10/2009 |
| JP | 4922978 B2 | 4/2012 |

OTHER PUBLICATIONS

Oct. 7, 2014 Written Opinion of the International Searching Authority issued in International Application No. PCT/JP2014/071126.

* cited by examiner

SOUND ABSORBING COVER, SOUND ABSORBING ASSEMBLY, AND MAGNETIC INDUCTION FOAM MOLDING DEVICE

TECHNICAL FIELD

The present invention relates to a sound absorbing cover and a sound absorbing assembly that are suitably placed around a noise source that emits heat, and to a magnetic induction foam molding device for producing the sound absorbing cover.

BACKGROUND ART

Components, such as an engine, a motor, and an exhaust gas recirculatuion (EGR) valve, which are noise sources are housed in an engine compartment. These components have three-dimensional shapes. In order to reduce noise, it is therefore desirable that a sound absorbing material be placed along a plurality of surfaces of each of these components. That is, sound absorbing covers having a three-dimensional shape so as to cover the surroundings of the components are needed.

Foam such as polyurethane foam is often used as a sound absorbing material and a vibration absorbing material. However, foam includes therein a large number of cells (bubbles) and thus has low thermal conductivity. Therefore, placing such foam around the engine, the motor, and other components, which emit heat, can cause malfunction because of accumulation of heat. Therefore, how to improve heat radiation performance of the foam is an issue when foam is used as a sound absorbing material.

Patent Document 1 describes a sound absorbing cover made of foam containing magnetic filler. In the sound absorbing cover described in Patent Document 1, the magnetic filler having high thermal conductivity is oriented in the thickness direction of the sound absorbing cover. This allows heat of a mating member to be promptly released through the oriented magnetic filler.

RELATED ART DOCUMENTS

Patent Documents

Patent Document 1: Japanese Patent No. 4922978
Patent Document 2: Japanese Patent Application Publication No. 2009-196101 (JP 2009-196101 A)
Patent Document 3: Japanese Patent No. 3514358

SUMMARY OF THE INVENTION

Problem to be Solved by the Invention

The sound absorbing cover described in Patent Document 1 is formed by assembling, into a three-dimensional shape, a sheet that is foam-molded in an expanded shape by folding the sheet along a hinge portion. This requires extra steps of assembling the sound absorbing cover as compared with a case where the sound absorbing cover is foam-molded in a three-dimensional shape originally. Furthermore, the sound absorbing cover described in Patent Document 1 has the hinge portion that is bent at the time of assembly, in addition to a sound absorbing portion that performs thermal transmission with a mating member. The thickness of the hinge portion is smaller than that of the sound absorbing portion. Therefore, the hinge portion is susceptible to cracks or the like and thus has a problem of reduction in strength. Furthermore, there is a risk of reduction in sound absorbing effects because of sound leakage from the hinge portion.

When the sound absorbing cover is foam-molded in a magnetic field of one direction, the magnetic filler can be oriented only in one direction. Therefore, if a box-shaped sound absorbing cover having side walls and a bottom wall is foam-molded in a box shape originally instead of assembling a sheet that is foam-molded in an expanded shape, for example, the magnetic filler can be oriented in the thickness direction in the side walls, but the magnetic filler cannot be oriented in the thickness direction in the bottom wall that intersects with the side walls. Therefore, an effect of heat radiation through the magnetic filler cannot be obtained in the bottom wall.

The present invention was accomplished in view of such circumstances, and an object of the present invention is to provide a three-dimensional-shaped sound absorbing cover that need not be assembled from an expanded shape to a three-dimensional shape, has a desired sound absorbing property, and is excellent in heat radiation and durability and a sound absorbing assembly including the sound absorbing cover. Another object of the present invention is to provide a magnetic induction foam molding device for producing the sound absorbing cover.

Means for Solving the Problem (1) In order to solve the above problem, a sound absorbing cover of the present invention that is made of foam containing magnetic filler and that is integrally molded in a three-dimensional shape for covering at least a part of a mating member that is a noise source is characterized by including a side wall that covers side surfaces of the mating member, and a bottom wall that covers a bottom surface of the mating member that intersects with the side surfaces of the mating member, wherein the magnetic filler is oriented in the thickness direction of each of the side wall and the bottom wall.

The sound absorbing cover of the present invention is integrally foamed in a three-dimensional shape so as to cover at least a part of the mating member. That is, the sound absorbing cover of the present invention is foam-molded in a three-dimensional shape directly from a foam raw material containing magnetic filler. It is therefore unnecessary to perform a step of first producing a sheet foam-molded in an expanded shape and subsequently assembling the produced sheet as has been conventionally done. It is therefore possible to reduce the number of production steps.

The sound absorbing cover of the present invention does not need to be assembled from an expanded shape to a three-dimensional shape, and therefore requires no thin hinge portion for connecting the side wall and the bottom wall. Accordingly, reduction in strength due to cracks or the like is unlikely to occur. Therefore, the sound absorbing cover of the present invention is excellent in durability. Furthermore, sound leakage from a hinge portion is unlikely to occur. With the sound absorbing cover of the present invention, it is possible to provide a desired sound absorbing property.

In the sound absorbing cover of the present invention, the magnetic filler is oriented in the thickness directions of each of the side wall and the bottom wall. The magnetic filler has high thermal conductivity and is successively oriented in a chain shape (including dotted line shape). Therefore, heat transmitted from the mating member to the side wall and the bottom wall is promptly released through the magnetic filler mainly oriented in a chain shape. Therefore, the sound absorbing cover of the present invention is excellent in heat radiation property.

(2) In the configuration of (1), the sound absorbing cover of the present invention is preferably arranged such that at least a part of each of the side wall and the bottom wall is disposed so as to be in contact with any of the side surfaces and the bottom surface of the mating member.

According to this configuration, a contact area between the sound absorbing cover and the mating member can be increased. This makes it possible to improve the heat radiation effect.

(3) In the configuration of (1) or (2), the sound absorbing cover of the present invention is preferably arranged such that at least one of the side wall and the bottom wall has a thinner portion.

The thinner portion may be formed in any of the inner peripheral surface, the outer peripheral surface, and the inside of one or both of the side wall and the bottom wall (hereinafter referred to as "side walls, etc." as appropriate). According to this configuration, the weight of the sound absorbing cover can be reduced because of the thinner portion. When the mating member is a motor, there is a problem of vibration and noise caused by cogging torque. In this respect, if a thinner portion is formed in the side walls, etc., spring constants of the side walls, etc. become small. This makes it possible to suppress vibration and noise caused by cogging torque of the motor (mating member). For example, if the thinner portion is formed in the inner peripheral surfaces of the side walls, etc., air layers can be formed between the side walls, etc. and the mating member. Interposing the air layers increases the effect of suppressing vibration and noise caused by cogging torque.

(4) A sound absorbing assembly of the present invention is characterized by including the sound absorbing cover of the present invention, and a fixing cover that is attached to an outer peripheral surface of the sound absorbing cover and that fixes, to a base, the sound absorbing cover and the mating member that is a noise source covered by the sound absorbing cover.

With the sound absorbing assembly of the present invention, the sound absorbing cover and the mating member can be easily attached to the base by the fixing cover. In addition, the sound shielding effect by the fixing cover can be expected. Furthermore, when the fixing cover is formed of a material, such as a metal, having high thermal conductivity, heat radiation from the sound absorbing cover can be further promoted.

For example, if the mating member such as a motor is fixed to the base by a fastener without a vibration isolator, vibration of the mating member transmits from the fastener to the base, and as a result, solid-borne noise undesirably occurs. In this respect, in the sound absorbing assembly of the present invention, the sound absorbing cover is interposed between the fixing cover and the mating member. Since the sound absorbing cover is made of foam containing magnetic filler, the sound absorbing cover functions as a vibration isolator. With the sound absorbing assembly of the present invention, it is therefore possible to suppress solid-borne noise.

(5) In the configuration of (4), the sound absorbing assembly of the present invention is preferably arranged such that the fixing cover includes a body in which the sound absorbing cover and the mating member are housed and a leg fixed to the base, and the sound absorbing cover and the mating member are supported so as to be spaced by the length of the leg from the base.

According to this configuration, the sound absorbing cover and the mating member are housed in the body of the fixing cover and are supported so as to be spaced from the base. This makes it possible to further improve the effect of suppressing solid-borne noise caused by vibration from the mating member. Furthermore, the flexibility of the way in which the sound absorbing assembly is disposed improves.

(6) A magnetic induction foam molding device of the present invention is a magnetic induction foam molding device for producing the sound absorbing cover of the invention that is characterized by including a molding die that defines a cavity inside, a first magnet disposed in an axial portion of the cavity, and a second magnet disposed in a peripheral portion and a bottom portion of the cavity wherein the magnetic induction foam molding device injects a mixed raw material containing a foam resin raw material and the magnetic filler into the cavity, and performs foam molding while lines of magnetic force are generated between the first magnet and the second magnet.

When the first magnet disposed in the axial portion of the cavity and the second magnet disposed in the peripheral portion and the bottom portion of the cavity are magnetized to opposite magnetic poles each other, lines of magnetic force in a direction from the axial portion toward the peripheral portion and the bottom portion (or the opposite direction) can be generated. By performing foam molding in such a magnetic field, the magnetic filler contained in the mixed raw material in the cavity can be oriented in the direction of the lines of magnetic force, in other words, in the thickness direction of each of the side wall and the bottom wall of the sound absorbing cover to be molded. With the magnetic induction foam molding device of the present invention, it is possible to easily produce the sound absorbing cover of the present invention.

DESCRIPTION OF THE REFERENCE NUMERALS

1: sound absorbing assembly, 2: sound absorbing cover, 20: side walls, 21: bottom wall, 22: opening for connector, 23: magnetic filler, 24: thinner portion, 3: fixing cover, 30: body, 31: legs, 32: opening for connector, 310: screw, 4: motor (mating member), 40: connector, 5: magnetic induction foam molding device, 50: mount, 51: bracket, 52: electromagnet, 53U, 53D: yoke, 54L, 54R: coil, 55U, 55D: pole piece, 540L, 540R: core, 541L, 541R: conductive wire, 6: molding die, 60U: upper die, 60D: lower die, 61U: core rod magnet, 61D: concave portion, 62D: box-shaped magnet, 63: cavity, 8: sound absorbing cover (Comparative Example 1), 80: urethane sheet, 81: hinge portion, 9: base, L: line of magnetic force

MODES FOR CARRYING OUT THE INVENTION

Embodiments of a sound absorbing cover, a sound absorbing assembly, and a magnetic induction foam molding device of the present invention are described below.

<First Embodiment>

[Configurations of Sound Absorbing Cover and Sound Absorbing Assembly]

Figure 1:
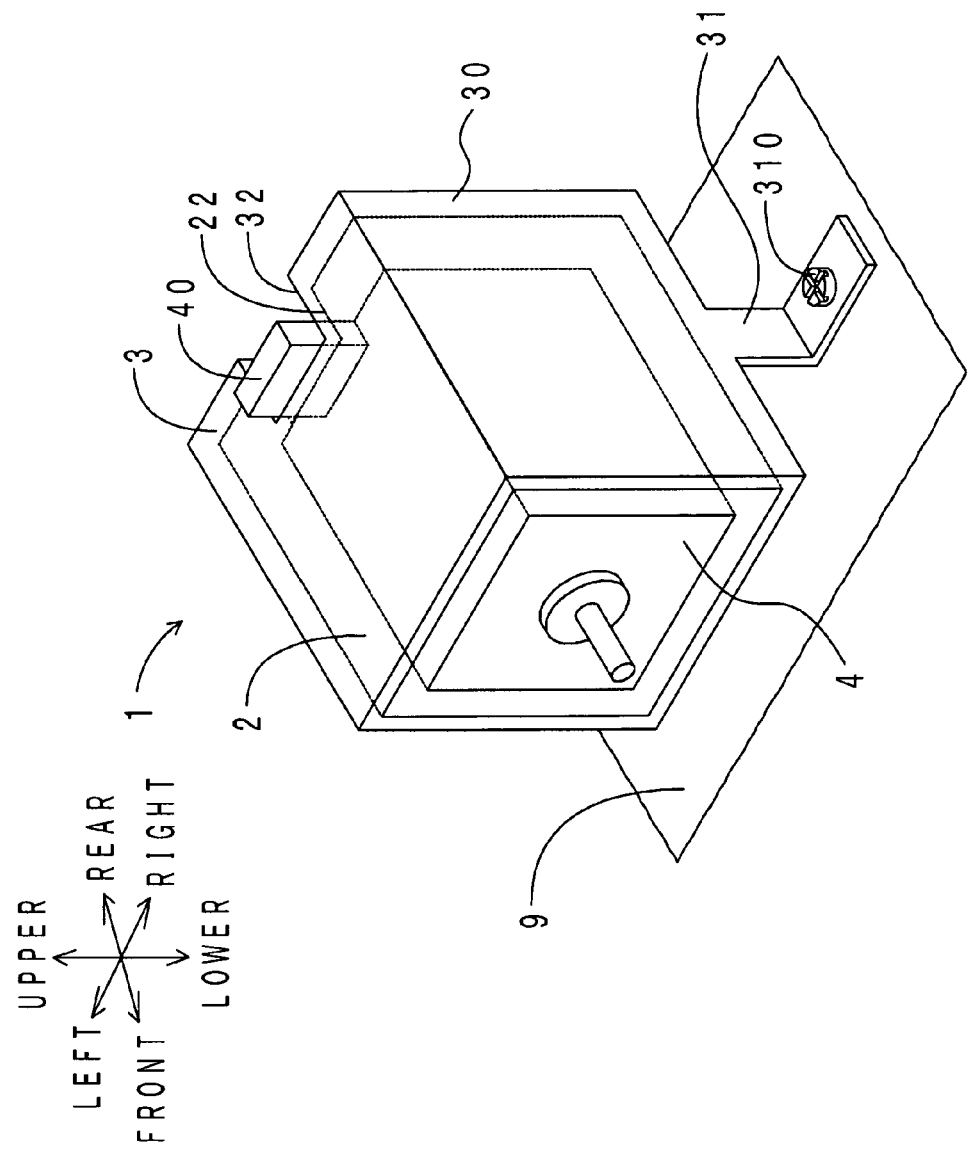
FIG. 1 is a perspective view of a sound absorbing assembly of a first embodiment.
Figure 2:
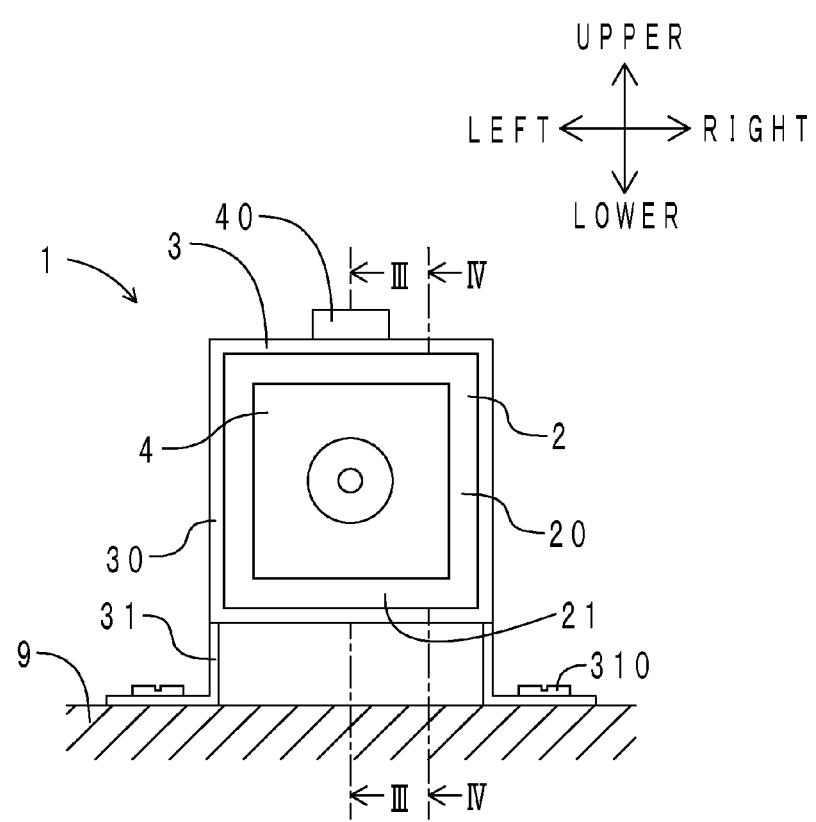
FIG. 2 is a front view of the sound absorbing assembly.
Figure 3:
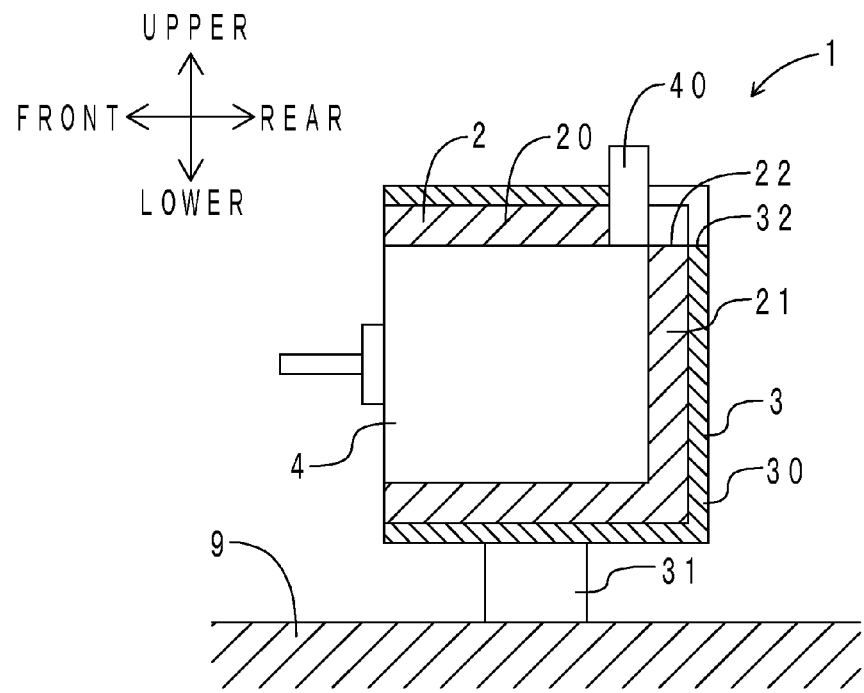
FIG. 3 is a cross-sectional view of the sound absorbing assembly in the up-down direction.
Figure 4:
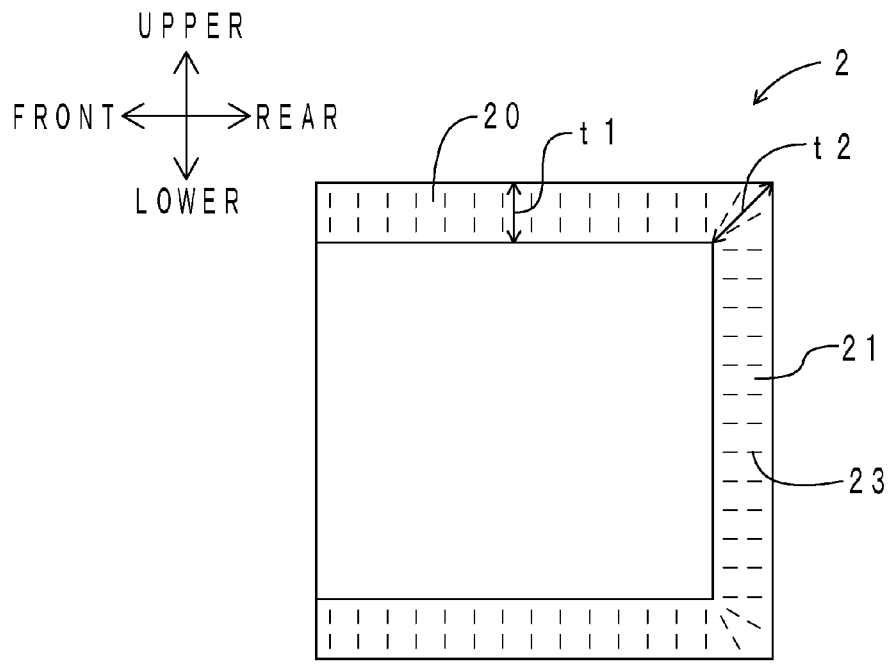
FIG. 4 is a schematic view showing a state where magnetic filler in a sound absorbing cover included in the sound absorbing assembly is oriented.

First, configurations of a sound absorbing cover and a sound absorbing assembly of the present embodiment are described. FIG. 1 is a perspective view of the sound absorbing assembly of the present embodiment. FIG. 2 is a front view of the sound absorbing assembly. FIG. 3 is a cross-sectional view of the sound absorbing assembly in the up-down direction. FIG. 4 schematically shows a state where magnetic filler in the sound absorbing cover of the present embodiment is oriented.

As shown in FIGS. 1 to 3, the sound absorbing assembly 1 of the present embodiment includes a sound absorbing cover 2 and a fixing cover 3.

The sound absorbing cover 2 is made of polyurethane foam containing stainless fiber and has a rectangular parallelepiped box shape having an opening on one end surface (front surface) thereof. The polyurethane foam containing stainless fiber is included in the concept of the "foam containing magnetic filler" according to the present invention. A motor 4 having a rectangular parallelepiped shape is housed on the inner side of the sound absorbing cover 2.

The sound absorbing cover 2 has side walls 20 and a bottom wall 21. The side walls 20 cover four side surfaces (an upper surface, a lower surface, a left surface, and a right surface) of the motor 4. The side walls 20 are in contact with the upper surface, the lower surface, the left surface, and the right surface of the motor 4. The bottom wall 21 covers a bottom surface (rear surface) of the motor 4. The bottom wall 21 is in contact with the rear surface of the motor 4. A connector 40 is provided to project from the upper surface on the back side of the motor 4. An opening for connector 22 through which the connector 40 is exposed is formed on the back side of the upper portion of the sound absorbing cover 2.

As shown in FIG. 4, the side walls 20 and the bottom wall 21 have the same thickness and are continuous with each other. The thickness t1 of the side walls 20 and the bottom wall 21 is 9 mm. The thickness t2 at the corners of the sound absorbing cover 2 (the length of a line connecting the outer peripheral surface of the corner and the inner peripheral surface of the corner) is larger than the thickness t1. In each of the side walls 20 and the bottom wall 21, the magnetic filler (stainless fiber) 23 is oriented in the thickness direction of each wall.

The fixing cover 3 is made of steel, and has a body 30 and a pair of legs 31. The body 30 has a rectangular parallelepiped box shape having an opening in the front surface thereof. The sound absorbing cover 2 and the motor 4 are housed on the inner side of the body 30. The body 30 is disposed so as to cover the entire outer peripheral surface (specifically, five surfaces, i.e., upper surface, lower surface, left surface, right surface, and rear surface) of the sound absorbing cover 2. An opening for connector 32 through which the connector 40 of the motor 4 is exposed is formed on the back side of the upper portion of the body 30.

The pair of legs 31 each has an L shape. Each leg in the pair of legs 31 is disposed on the left and right sides of the body 30. The pair of legs 31 is provided to project from the lower surface of the body 30. The horizontal portion of each of the legs 31 is fixed to a base 9 by a screw 310. By fixing the legs 31 to the base 9, the sound absorbing cover 2 and the motor 4 housed in the body 30 are fixed to the base 9. The motor 4 is supported so as to be spaced from the base 9 via the sound absorbing cover 2.

[Method for Producing Sound Absorbing Cover]

Next, a method for producing a sound absorbing cover is described. The sound absorbing cover 2 is integrally molded in a box shape so as to cover the outer peripheral surface of the motor 4. The method for producing the sound absorbing cover 2 includes a mixed raw material preparing step and a foam molding step. In the mixed raw material preparing step, a mixed raw material is prepared by mixing a foaming urethane resin raw material, stainless fiber, a foaming agent, a catalyst, etc. In the foam molding step, the prepared mixed raw material is injected into a cavity of a molding die. Foam molding is performed while a magnetic field is applied.

Figure 5:
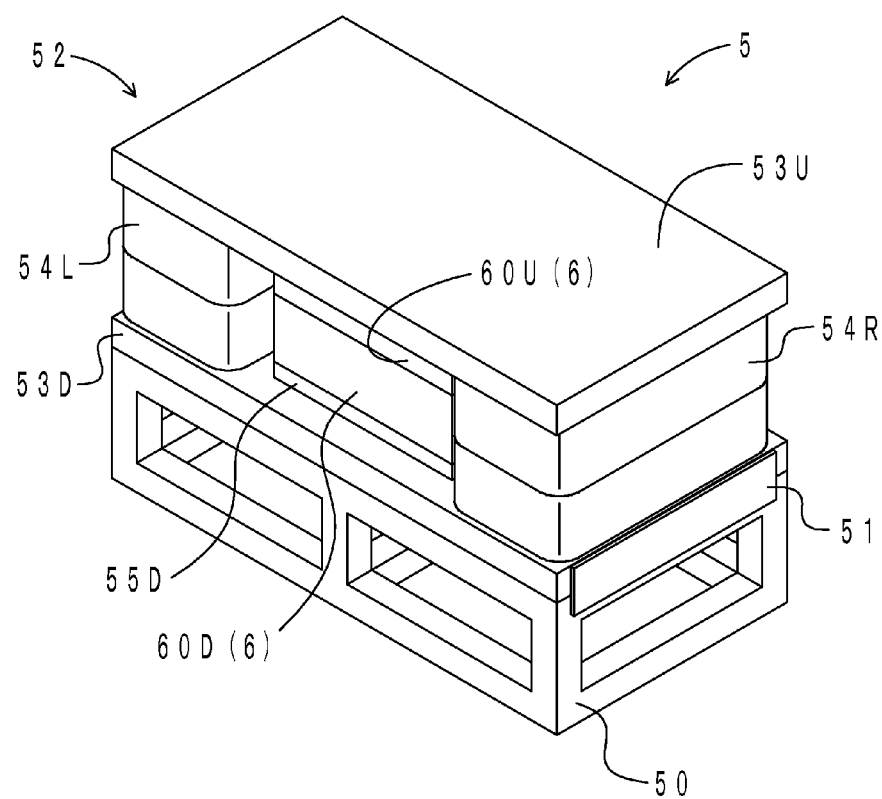
FIG. 5 is a perspective view of a magnetic induction foam molding device used to produce the sound absorbing cover.
Figure 6:
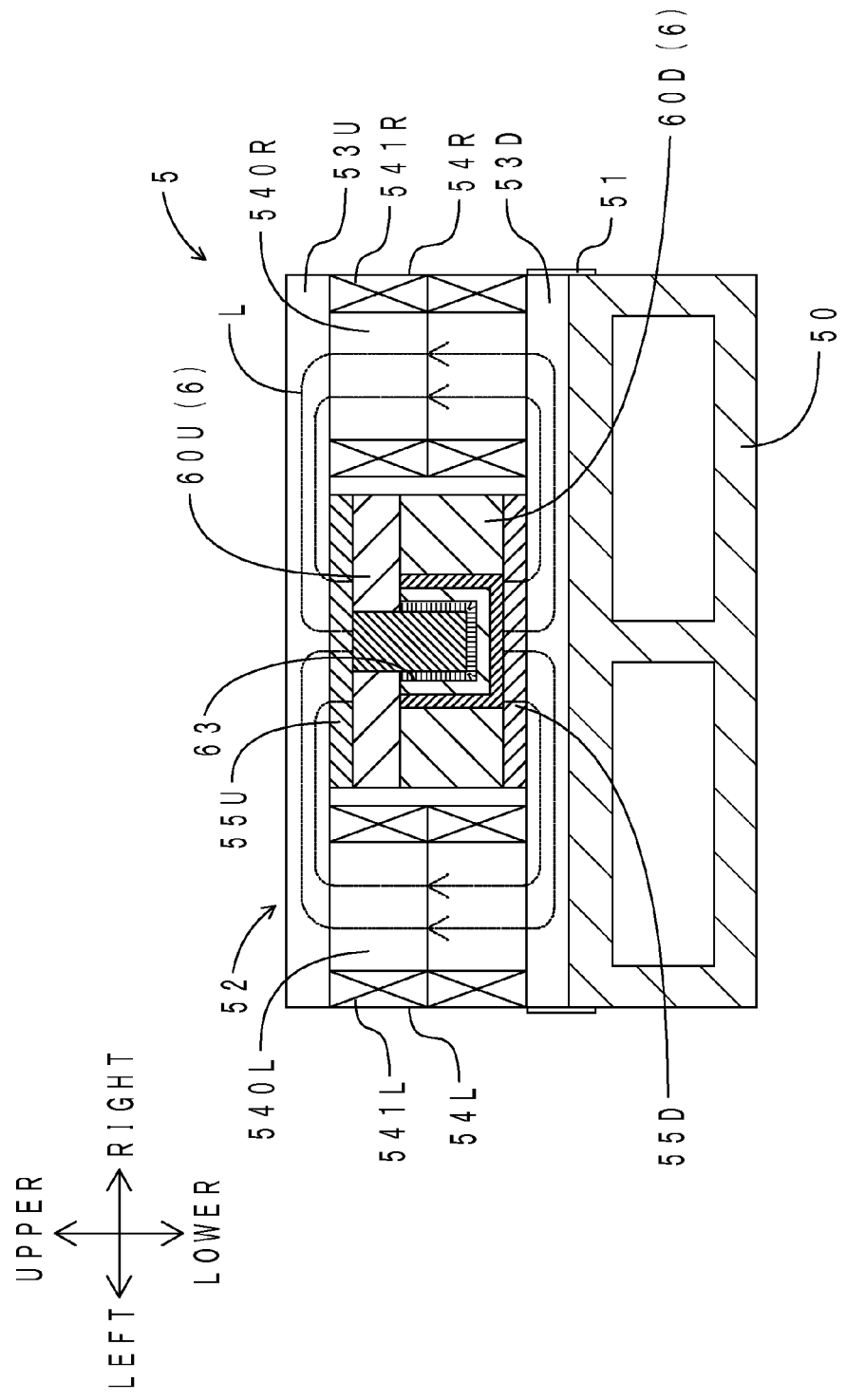
FIG. 6 is a cross-sectional view of the magnetic induction foam molding device.
Figure 7:
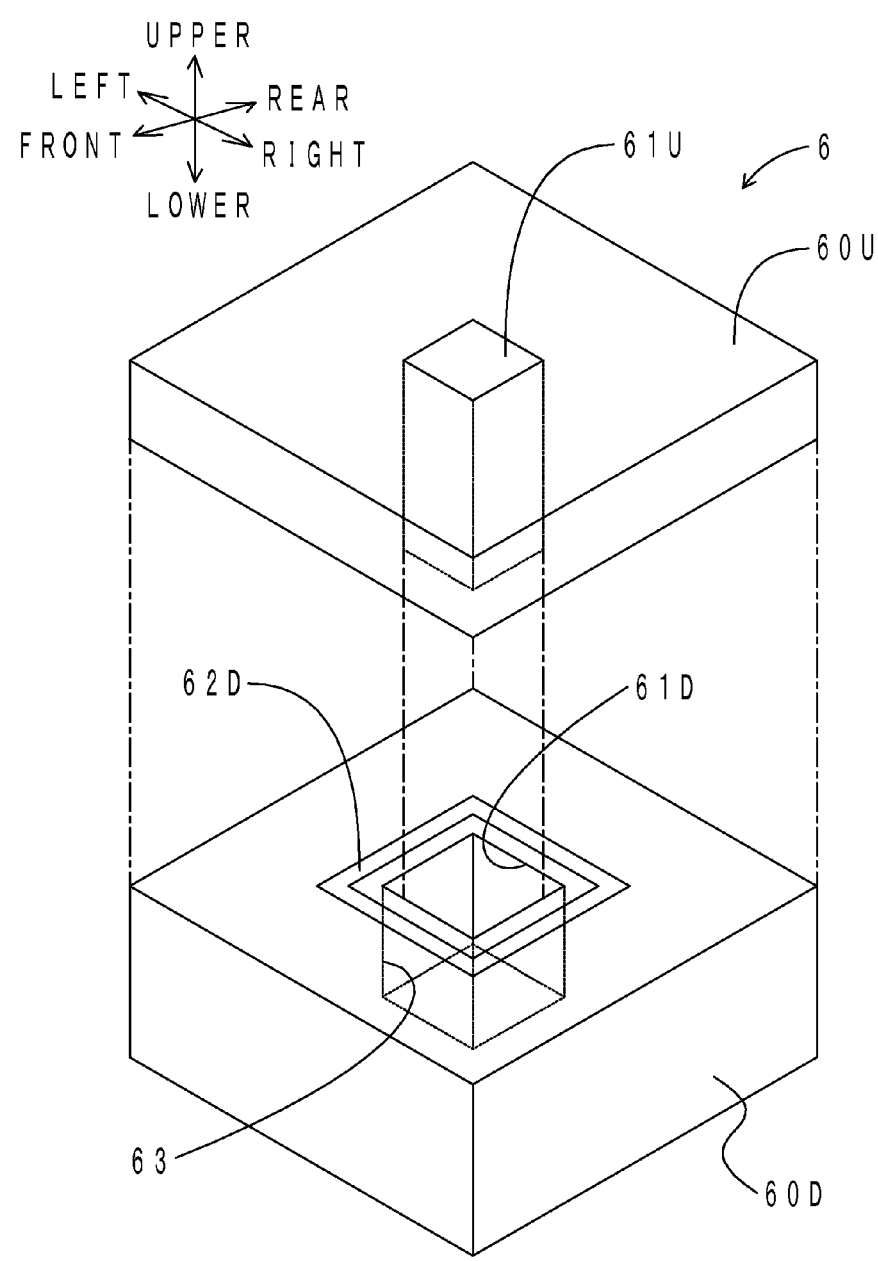
FIG. 7 is a perspective view of a state where a molding die is opened.
Figure 8:
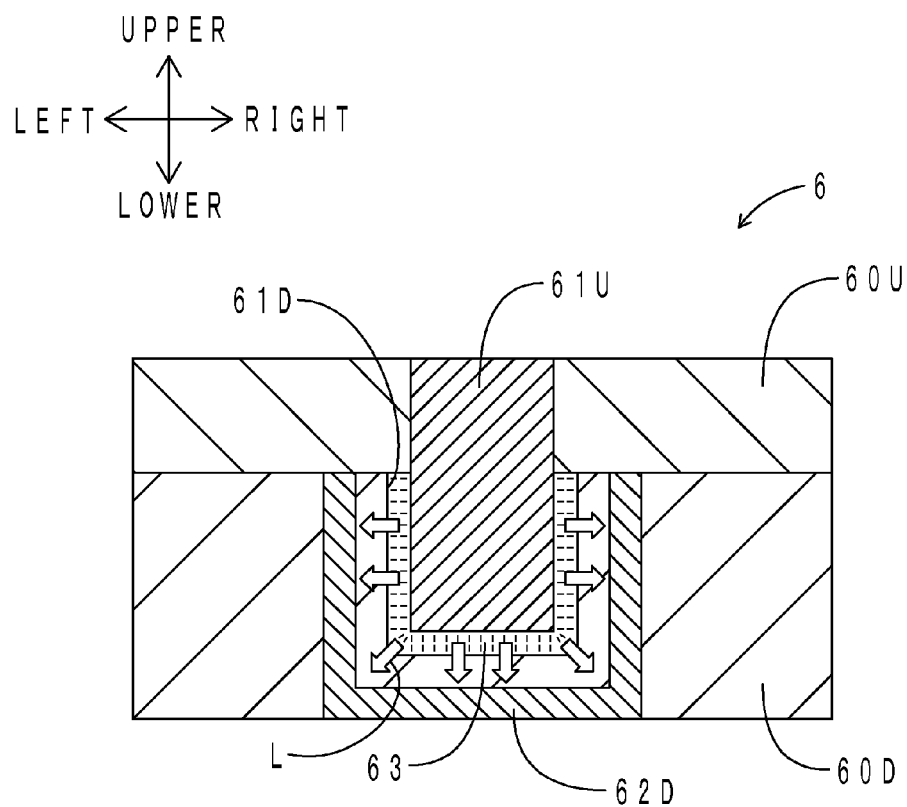
FIG. 8 is an explanatory view showing directions of lines of magnetic force in a cavity of the molding die.

First, a configuration of a magnetic induction foam molding device used to produce the sound absorbing cover of the present embodiment is described. FIG. 5 is a perspective view of the magnetic induction foam molding device used to produce the sound absorbing cover of the present embodiment. FIG. 6 is a cross-sectional view of the magnetic induction foam molding device. FIG. 7 is a perspective view of a state where the molding die is opened. FIG. 8 shows directions of lines of magnetic force in the cavity of the molding die. In FIG. 6, for convenience of description, hatching in yokes and cores is omitted.

As shown in FIGS. 5 and 6, the magnetic induction foam molding device 5 includes a mount 50, an electromagnet 52, and a molding die 6.

The electromagnet 52 is placed on the upper surface of the mount 50. The electromagnet 52 and the mount 50 are fixed to each other by screwing a bracket 51 onto the electromagnet 52 and the mount 50. The electromagnet 52 includes yokes 53U and 53D, coils 54L and 54R, and pole pieces 55U and 55D.

The yoke 53U is made of iron and has a flat plate shape. The yoke 53D is also made of iron and has a flat plate shape. The yokes 53U and 53D are disposed to face each other in the up-down direction.

The coils 54L are provided between the yokes 53U and 53D. The coils 54L are disposed on the left side of the molding die 6. The coils 54L are disposed as two portions overlapping in the up-down direction. Each of the coils 54L includes a core 540L and a conductive wire 541L. The core 540L is made of iron and has a shape of a column extending in the up-down direction. The conductive wire 541L is wound around the outer peripheral surface of the core 540L. The conductive wire 541L is connected to a power source (not shown).

The coils 54R are provided between the yokes 53U and 53D. The coils 54R are disposed on the right side of the molding die 6. The coils 54R are disposed as two portions overlapping in the up-down direction. Each of the coils 54R has a similar configuration to the coils 54L. That is, each of the coils 54R has a core 540R and a conductive wire 541R. The conductive wire 541R is wound around the outer peripheral surface of the core 540R. The conductive wire 541R is connected to the power source (not shown).

The pole piece 55U is made of iron and has a flat plate shape. The pole piece 55U is disposed at the center of the lower surface of the yoke 53U. The pole piece 55U is provided between the yoke 53U and the molding die 6. The pole piece 55D is made of iron and has a flat plate shape. The pole piece 55D is disposed at the center of the upper surface of the yoke 53D. The pole piece 55D is provided between the yoke 53D and the molding die 6.

The molding die 6 is disposed between the coils 54L and the coils 54R. As shown in FIGS. 7 and 8, the molding die 6 includes an upper die 60U and a lower die 60D. The upper die 60U is made of aluminum and has a square plate shape. The upper die 60U includes a core rod magnet 61U. The core rod magnet 61U is made of iron as with the pole piece 55U and has a square pillar shape. The core rod magnet 61U is disposed at the center of the upper die 60U. The upper portion of the core rod magnet 61U is embedded in the upper die 60U. The upper surface of the core rod magnet 61U is exposed on an upper surface of the upper die 60U. The core rod magnet 61U is included in the concept of the "first magnet" according to the present invention.

The lower die 60D is made of aluminum and has a rectangular parallelepiped shape. A concave portion 61D is formed in the upper surface of the lower die 60D. The inner space of the concave portion 61D has a rectangular parallelepiped shape. The lower die 60D includes a box-shaped magnet 62D. The box-shaped magnet 62D is made of iron as with the pole piece 55D and has a box shape. The box-shaped magnet 62D is embedded in the lower die 60D. The box-shaped magnet 62D is disposed so as to surround the concave portion 61D. The lower surface of the box-shaped magnet 62D is exposed on the lower surface of the lower die 60D. The box-shaped magnet 62D is included in the concept of the "second magnet" according to the present invention.

In a state where the upper die 60U and the lower die 60D are clamped to each other, the core rod magnet 61U is disposed at the center of the concave portion 61D. This forms, in the concave portion 61D of the lower die 60D, a ring-shaped cavity 63 defined by the lower surface of the upper die 60U and the outer peripheral surface of the core rod magnet 61U. The cavity 63 is filled with a certain mixed raw material.

Next, an operation of the magnetic induction foam molding device of the present embodiment is described. First, both of the power source connected to the conductive wire 541L and the power source connected to the conductive wire 541R are turned on. This causes the upper end of the cores 540L of the coils 54L to be magnetized to the N pole and causes the lower end of the cores 540L of the coils 54L to be magnetized to the S pole. Accordingly, lines of magnetic force L (shown by the dotted lines in FIG. 6) flowing from bottom to top is generated in the cores 540L. Similarly, the upper end of the cores 540R of the coils 54R is magnetized to the N pole and the lower end of the cores 540R of the coils 54R is magnetized to the S pole. Accordingly, the lines of magnetic force L flowing from bottom to top are generated in the cores 540R.

The lines of magnetic force L radiated from the upper end of the cores 540L of the coils 54L flow into the molding die 6 through the yoke 53U and the pole piece 55U. The lines of magnetic force L flow into the lower end of the cores 540L through the pole piece 55D and the yoke 53D. Similarly, the lines of magnetic force L radiated from the upper end of the cores 540R of the coils 54R flow into the molding die 6 through the yoke 53U and the pole piece 55U. The lines of magnetic force L flow into the lower end of the cores 540R through the pole piece 55D and the yoke 53D. Both of the pole piece 55U and the core rod magnet 61U are made of iron. Accordingly, both of the core rod magnet 61U and the pole piece 55U are magnetized to the N pole. Furthermore, both of the pole piece 55D and the box-shaped magnet 62D are made of iron. Accordingly, both of the box-shaped magnet 62D and the pole piece 55D are magnetized to the S pole. Thus, the lines of magnetic force L flowing from the core rod magnet 61U toward the box-shaped magnet 62D are generated.

Directions of the lines of magnetic force L in the cavity 63 are described below. As shown in FIG. 8, the inner peripheral surface of the cavity 63 is formed by the core rod magnet 61U magnetized to the N pole. The cavity 63 is surrounded by the box-shaped magnet 62D magnetized to the S pole. Accordingly, as indicated by the white arrow in FIG. 8, the lines of magnetic force L are generated in the cavity 63 in the direction of the core rod magnet 61U to the box-shaped magnet 62D. The stainless fiber (magnetic filler) in the mixed raw material is oriented along the lines of magnetic force L. Thus, the sound absorbing cover of the present embodiment is produced.

[Effects]

Next, effects of the sound absorbing cover, the sound absorbing assembly, and the magnetic induction foam molding device of the present embodiment are described.

The sound absorbing cover 2 is integrally molded in a box shape so as to cover the outer peripheral surface of the motor 4. That is, the sound absorbing cover 2 is foam-molded in a three-dimensional shape directly from a foam raw material containing the magnetic filler 23. It is therefore unnecessary to perform a step of first producing a sheet foam-molded in an expanded shape and subsequently assembling the produced sheet as has been conventionally done. Furthermore, the side walls 20 of the sound absorbing cover 2 that cover four side surfaces of the motor 4 are continuous with each other. This makes it unnecessary to perform a step of bonding separately produced side walls 20. Consequently, with the sound absorbing cover 2, it is possible to reduce the number of production steps.

The sound absorbing cover 2 does not need to be assembled from an expanded shape to a three-dimensional shape, and therefore requires no thin hinge portion for connecting the side walls 20 and the bottom wall 21. That is, it is unnecessary to reduce the thickness of the corners of the sound absorbing cover 2. In the sound absorbing cover 2, the side walls 20 and the bottom wall 21 have the same thickness and are continuous with each other. Accordingly, a crack is unlikely to occur at the corners, whereby reduction in strength is unlikely to occur. Therefore, the sound absorbing cover 2 is excellent in durability. Furthermore, the sound absorbing cover 2 is capable of absorbing sound from five directions, i.e., the side walls 20 and the bottom wall 21. In addition, since the thickness of the corners is secured, sound leakage is unlikely to occur. Therefore, with the sound absorbing cover 2, a desired sound absorbing property can be achieved.

With the sound absorbing cover 2, the magnetic filler 23 is oriented in the thickness direction in the side walls 20 and the bottom wall 21. This allows heat of the motor 4 to be released to the outside through a substantially shortest path of the side walls 20 and the bottom wall 21. Furthermore, the side walls 20 and the bottom wall 21 are disposed so as to be in contact with the side surfaces and the bottom surface of the motor 4. Accordingly, a contact area between the sound absorbing cover 2 and the motor 4 is large. It is therefore possible to fully exert the excellent heat radiation property of the sound absorbing cover 2.

The sound absorbing assembly 1 includes the fixing cover 3. This makes it possible to easily attach, to the base 9, the sound absorbing cover 2 and the motor 4. The fixing cover 3 is made of steel and is disposed so as to be in contact with the outer peripheral surface of the sound absorbing cover 2. The thermal conductivity of the fixing cover 3 is larger than that of the sound absorbing cover 2. This allows heat of the motor 4 to be easily released to the outside from the sound absorbing cover 2 through the fixing cover 3. Consequently, the heat radiation property further improves. Furthermore, in the sound absorbing assembly 1, the sound absorbing cover 2 is interposed between the motor 4 and the body 30, and the entire portion of the motor 4, the sound absorbing cover 2, and the body 30 is supported by the legs 31 so as to be spaced from the base 9. This suppresses transmission of vibration of the motor 4 to the fixing cover 3 and the base 9. It is therefore possible to suppress solid-borne noise.

With the magnetic induction foam molding device 5, stable lines of magnetic force L can be generated in the cavity 63 in the direction of the core rod magnet 61U to the box-shaped magnet 62D. By performing foam molding in such a magnetic field, the magnetic filler 23 contained in the mixed raw material in the cavity 63 can be oriented in the directions of the lines of magnetic force L, in other words, in the thickness direction of each of the side walls 20 and the bottom wall 21 of the sound absorbing cover 2 to be molded. Therefore, with the magnetic induction foam molding device 5, it is possible to easily produce the sound absorbing cover 2.

<Second Embodiment>

A main difference between a sound absorbing cover, a sound absorbing assembly, and a magnetic induction foam molding device of the present embodiment and the sound absorbing cover, the sound absorbing assembly, and the magnetic induction foam molding device of the first embodiment is a shape of the sound absorbing cover. In the following description, only the difference is described.

Figure 9:
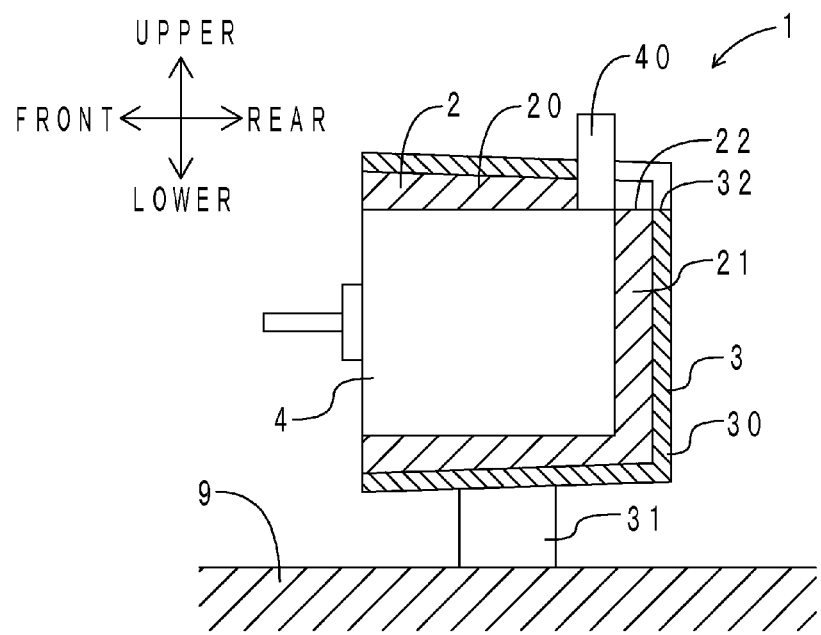
FIG. 9 is a cross-sectional view of a sound absorbing assembly of a second embodiment in the up-down direction.

FIG. 9 is a cross-sectional view of the sound absorbing assembly of the present embodiment in the up-down direction. In FIG. 9, portions that correspond to those of FIG. 3 are denoted by the same reference symbols. As shown in FIG. 9, the sound absorbing cover 2 has a rectangular parallelepiped box shape having an opening in the front surface thereof. The sound absorbing cover 2 has the side walls 20 and the bottom wall 21. The side walls 20 cover four side surfaces (upper surface, lower surface, left surface, and right surface) of the motor 4. The side walls 20 are in contact with the upper surface, the lower surface, the left surface, and the right surface of the motor 4. As FIG. 9 shows that the cross sections of the side walls 20 are tapered, the thickness of each of the side walls 20 becomes smaller from the front end toward the rear end thereof. The thickness (maximum thickness) of the front end of each of the side walls 20 is 9.2 mm and the thickness (minimum thickness) of the rear end of each of the side walls 20 is 7.2 mm. The bottom wall 21 covers the bottom surface (rear surface) of the motor 4. The bottom wall 21 is in contact with the rear surface of the motor 4. The thickness of the bottom wall 21 is constant. The thickness of the bottom wall 21 is 9.2 mm, which is the same as that of the front end of each of the side walls 20.

Portions of the sound absorbing cover, the sound absorbing assembly, and the magnetic induction foam molding device of the present embodiment that are identical to those of the sound absorbing cover, the sound absorbing assembly, and the magnetic induction foam molding device of the first embodiment have similar effects. In the sound absorbing cover 2 of the present embodiment, the thickness of each of the side walls 20 becomes smaller from the front end toward the rear end thereof. It is therefore easy to take out the sound absorbing cover 2 from a lower die after molding.

<Third Embodiment>

A main difference between a sound absorbing cover, a sound absorbing assembly, and a magnetic induction foam molding device of the present embodiment and the sound absorbing cover, the sound absorbing assembly, and the magnetic induction foam molding device of the first embodiment is a shape of the sound absorbing cover. In the following description, only the difference is described.

Figure 10:
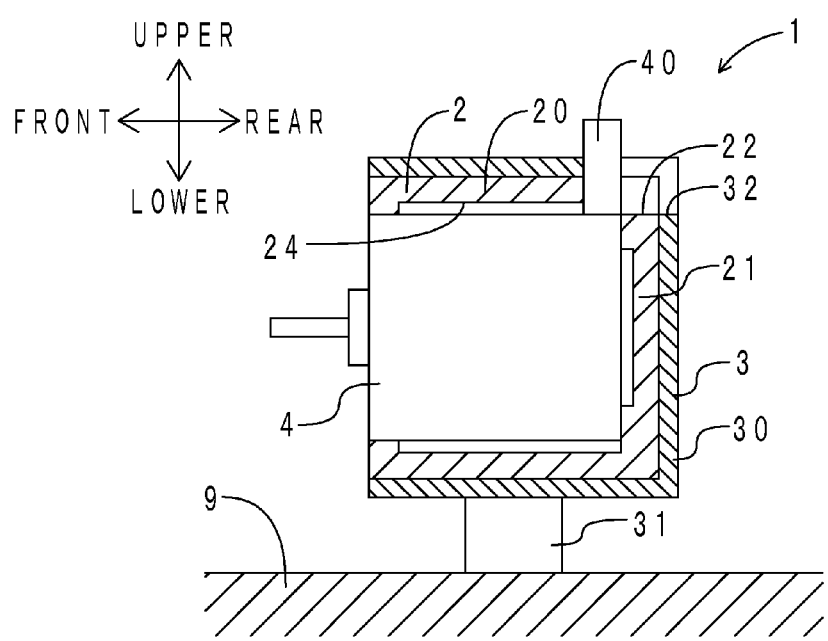
FIG. 10 is a cross-sectional view of a sound absorbing assembly of a third embodiment in the up-down direction.

FIG. 10 is a cross-sectional view of the sound absorbing assembly of the present embodiment in the up-down direction. In FIG. 10, portions that correspond to those of FIG. 3 are denoted by the same reference symbols. As shown in FIG. 10, the sound absorbing cover 2 has a rectangular parallelepiped box shape having an opening in the front surface thereof. The sound absorbing cover 2 has side walls 20 and a bottom wall 21. The side walls 20 cover four side surfaces (upper surface, lower surface, left surface, and right surface) of the motor 4. The bottom wall 21 covers the bottom surface (rear surface) of the motor 4. The side walls 20 and the bottom wall 21 each have a thinner portion 24.

The thinner portions 24 are provided to be recessed in the inner peripheral surfaces of the side walls 20 and the bottom wall 21. The inner space of each of the thinner portions 24 has a rectangular thin plate shape. The thickness of each of the thinner portions 24 is 3 mm. Portions of the side walls 20 other than the thinner portions 24 are in contact with the upper surface, the lower surface, the left surface, and the right surface of the motor 4. A portion of the bottom wall 21 other than the thinner portion 24 is in contact with the rear surface of the motor 4.

Portions of the sound absorbing cover, the sound absorbing assembly, and the magnetic induction foam molding device of the present embodiment that are identical to those of the sound absorbing cover, the sound absorbing assembly, and the magnetic induction foam molding device of the first embodiment have similar effects. In the sound absorbing cover 2 of the present embodiment, the weight of the sound absorbing cover 2 can be reduced because of the thinner portions 24. Furthermore, the spring constants of the side walls 20 and the bottom wall 21 become small. Furthermore, air layers can be formed between the motor 4 and each of the side walls 20, and between the motor 4 and the bottom wall 21. This makes it possible to suppress vibration and noise of the motor 4 caused by cogging torque.

<Other Remarks>

The embodiments of the sound absorbing cover, the sound absorbing assembly, and the magnetic induction foam molding device of the present invention have been described. However, the embodiment of the present invention is not particularly limited to those described above. Various modifications and improvements that can be made by a person skilled in the art are also possible.

(1) The material, the shape, the thickness, and other characteristics of the sound absorbing cover are not limited to those of the above embodiments. The shape and the thickness of the sound absorbing cover can be determined as appropriate in accordance with the shape, the size, emitted heat, magnitude of vibration, and other characteristics of a mating member that will be a noise source. For example, the sound absorbing cover may have a cylindrical shape with a bottom instead of a box shape described in the above embodiments. The thickness of the sound absorbing cover may be constant or may be changed as in the second embodiment. The sound absorbing cover need not necessarily cover the entire outer peripheral surface of the mating member. The sound absorbing cover may have a three-dimensional shape so as to cover a part of the side surfaces and a part of the bottom surface of the mating member. The types of the mating member are not limited in particular. When the mating member is a vibrational member that emits heat, the effects of the sound absorbing cover according to the present invention can be exerted.

A foam resin such as polyethylene foam or polypropylene foam can be used as a material of the sound absorbing cover in addition to polyurethane foam described above. As the magnetic filler, so-called magnetic materials may be used. For example, ferromagnetic substances such as iron, nickel, cobalt, gadolinium, or stainless steel; antiferromagnetic substances such as MnO, $Cr_2O_3$, $FeCl_2$, or MnAs; and alloys using these substances are suitably used. Above all, for example, stainless steel and copper-iron alloy are suitably used from the perspective of large thermal conductivity and excellent workability as filler. Furthermore, composite particles obtained by attaching magnetic particles on surfaces of thermally conductive particles having large thermal conductivity may be used as the magnetic filler. Carbon materials such as graphite, expanded graphite, and carbon fiber are suitably used as a material of the thermally conductive particles.

The size (maximum length) of the magnetic filler may be determined in consideration of the dispersibility, the orientation, the thickness of the sound absorbing cover, and other characteristics. For example, magnetic filler in a range of 0.1 mm to 5 mm is easily available and is therefore suitably used. The shape of the magnetic filler can be any of various shapes such as a spherical shape (true sphere shape or substantially true sphere shape), an elliptic spherical shape, an oval spherical shape (shape obtained by connecting a pair of hemispheres that face each other with a cylinder), a waterdrop shape, a column shape, a thin plate shape, a foil shape, a fiber shape, and a needle shape.

The content ratio of the magnetic filler in the sound absorbing cover may be determined as appropriate in consideration of the improvement effect of thermal transmission, sound absorbing property, cost, and other conditions. For example, in order to exert the improvement effect of thermal transmission, it is desirable that the content ratio of the magnetic filler be 0.1% or more by volume assuming that the volume of the sound absorbing cover (foam) is 100% by volume. The content ratio of the magnetic filler is more preferably 1% or more by volume. Considering the dispersibility of the magnetic filler, the influence on the sound absorbing property, etc., it is desirable that the content ratio of the magnetic filler be 10% or less by volume. If the content ratio of the magnetic filler exceeds 10% by volume, there is a risk of an adverse effect on foam molding. In view of this, it is more preferable that the content ratio of the magnetic filler be 3% or less by volume.

From the perspective of increasing the contact area between the sound absorbing cover and the mating member, it is desirable that the side walls and the bottom wall of the sound absorbing cover be disposed so as to be in contact with the side surfaces and the bottom surface of the mating member. However, the side walls and the bottom wall of the sound absorbing cover may be disposed so as not to be in contact with the side surfaces and the bottom surface of the mating member. For example, when a thinner portion is formed in one or both of the side wall and the bottom wall, the thinner portion may be formed in any of the inner peripheral surface, the outer peripheral surface and the inside of the side walls, etc. The shape, the number, the position, and other characteristics of the thinner portion are not limited in particular.

(2) In the above embodiments, the sound absorbing cover and the motor are fixed to the base by the fixing cover. However, the method in which the sound absorbing cover and the motor are fixed to the base is not limited to that described in the above embodiments. For example, the motor is fixed to the base without using the fixing cover, and the sound absorbing cover is mounted around the motor. In the sound absorbing assembly including the sound absorbing cover and the fixing cover, the material, the shape, and other characteristics of the fixing cover are not limited in particular. The material of the fixing cover may be a metal such as iron, stainless steel, or aluminum or a resin such as polyamide or polyethylene, as long as the material of the fixing cover has higher rigidity than that of the sound absorbing cover. If the fixing cover is made of a material having larger thermal conductivity (e.g., metal), the heat radiation property of the sound absorbing cover improves.

(3) In the above embodiments, foam molding is performed by using the magnetic induction foam molding device. However, a foam molding method is not limited in particular, as long as a magnetic field having a substantially uniform magnetic flux density in the cavity can be formed. For example, permanent magnets or electromagnets may be disposed in the vicinity of the surfaces of both one end and the other end of the molding die so as to sandwich the molding die. It is desirable that lines of magnetic force that constitute the magnetic field form a closed loop. This suppresses leakage of the lines of magnetic force, thereby making it possible to form a stable uniform magnetic field in the cavity. For example, it is preferable that a difference in magnetic flux density in the cavity of the molding die be within ±10%. The difference is more preferably within ±5%, further more preferably within ±3%. By forming a uniform magnetic field in the cavity of the molding die, it is possible to suppress uneven distribution of the magnetic filler, thereby obtaining a desired orientation state. It is desirable that the magnetic field be applied while the viscosity of the mixed raw material containing the foam resin raw material and the magnetic filler is relatively low. If the magnetic field is applied after the viscosity of the mixed raw material is increased and foam molding is finished to some extent, the magnetic filler is hard to be oriented. It is therefore difficult to obtain desired thermal transmitting and sound absorbing properties. Note that it is unnecessary to apply the magnetic field during the entire period of foam molding.

EXAMPLES

Next, the present invention is described more specifically with reference to Examples.

<Production of Sound Absorbing Cover of Example 1>

A sound absorbing cover having the shape of the second embodiment described above was produced (see FIG. 9). First, composite particles were produced as magnetic filler by attaching magnetic particles onto surfaces of thermally conductive particles. Expanded graphite powder ("SYZR502FP" purchased from SANYO TRADING CO., LTD.) and natural graphite powder ("F#2" produced by Nippon Graphite Industries, Co., Ltd.) were used as the thermally conductive particles. Stainless steel powder ("DAP410L" produced by Daido Steel Co., Ltd., SUS410, spherical shape, the average particle diameter: 10 μm) was used as the magnetic particles. First, 50 parts by mass of the expanded graphite powder, 50 parts by mass of the natural graphite powder, 175 parts by mass of the stainless steel powder, and 5.5 parts by mass of hydroxypropyl methylcellulose ("TC-5" produced by Shin-Etsu Chemical Co., Ltd.) serving as a binder were put into a container of a high speed stirring-type mixing granulator ("NMG-1L" produced by Nara Machinery Co., Ltd.) and mixed for about 3 minutes. Next, water was added to the mixture, and they were further mixed for 20 minutes. Obtained powder was dried to obtain composite particles. In the composite particles, 50% by mass of the composite particles was particles including expanded graphite particles as thermally conductive particles, and 50% by mass of the composite particles was particles including natural graphite particles as thermally conductive particles.

Next, a polyol raw material and a polyisocyanate raw material were prepared as a foam resin raw material. The polyol raw material was prepared by mixing 100 parts by mass of polyether polyol ("S-0248" produced by Sumika Bayer Urethane Co., Ltd., average molecular weight: 6000, the number of functional groups:3, OH value: 28 mg KOH/g), 2 parts by mass of diethylene glycol (produced by Mitsubishi Chemical Corporation) which is a cross-linking agent, 2 parts by mass of water which is a foaming agent, 1.5 parts by mass of tetraethylenediamine-based catalyst ("Kao riser (registered trademark) No. 31" produced by Kao Corporation), and 0.5 parts by mass of silicone-based foam stabilizer ("SZ-1333" produced by Dow Corning Toray Co., Ltd.). Diphenyl methane diisocyanate (MDI) ("NE1320B" produced by BASF INOAC Polyurethanes Ltd., NCO=44.8 wt %) was prepared as the polyisocyanate raw material.

Subsequently, 261.5 parts by mass of the composite particles and 20 parts by mass of a plasticizing agent were added to 100 parts by mass of the polyol raw material, and they were mixed to prepare premix polyol. Subsequently, 223.9 g of the premix polyol and 8.9 g of the polyisocyanate raw material were mixed to obtain a mixed raw material. The mixed raw material was injected into the cavity of the molding die shown in FIG. 7 described above, and then the molding die was clamped. The molding die was placed in the magnetic induction foam molding device, and foam molding was performed in the same manner as in the above embodiments (see FIGS. 5 and 6 described above). After completion of the foam molding, the sound absorbing cover of the shape according to the second embodiment was obtained by taking it out from the molding die.

<Production of Sound Absorbing Cover of Comparative Example 1>

Figure 11:
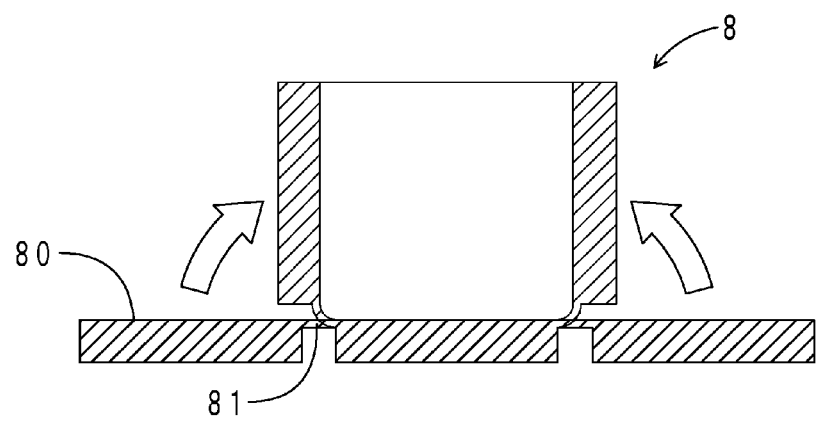
FIG. 11 is a cross-sectional view of a urethane sheet in an expanded shape used to produce a sound absorbing cover of Comparative Example 1.

A urethane sheet of an expanded shape was produced and assembled into a box shape to produce a sound absorbing cover. The thickness of the side walls and the bottom wall of the produced sound absorbing cover was set to 9 mm, which is the same as that of the sound absorbing cover of the first embodiment. FIG. 11 is a cross-sectional view of the produced urethane sheet of the expanded shape. First, the mixed raw materials which are the same as those used in production of the sound absorbing cover of Example 1 were foam-molded to obtain a urethane sheet 80 of the expanded shape shown in FIG. 11. Next, as indicated by the white arrow in FIG. 11, hinge portions 81 of the urethane sheet 80 were bent to produce a sound absorbing cover 8 (indicated by the thin line in FIG. 11) having the same box shape as that of the first embodiment. The produced sound absorbing cover was used as the sound absorbing cover of Comparative Example 1.

<Evaluation of Sound Absorbing Property and Heat Radiation Property>

The sound absorbing covers of Example 1 and Comparative Example 1 were mounted around a motor in the same manner as in the first embodiment and the second embodiment, respectively, to evaluate a sound absorbing property and a heat radiation property thereof. In this case, the sound absorbing cover of Comparative Example 1 was mounted around the motor by bonding four side walls. Note that a fixing cover was not used in evaluation of the sound absorbing property and the heat radiation property.

[Sound Absorbing Property]

The sound absorbing property of the sound absorbing cover was evaluated by measuring a noise level during operation of the motor. A method for measuring the noise level is described below. First, below a support plate, the motor was suspended with its bottom surface facing downward by using a hemp cord. Next, a measuring microphone was placed so as to face one of the side walls of the sound absorbing cover mounted around the motor. The measuring microphone was placed so as to be spaced by 100 mm from the side wall of the sound absorbing cover. The motor was put into operation, and the noise level was measured. Measurement of the noise level was performed in an anechoic room. The noise level was measured by using a measuring device "Type3160-A-042" and measuring software "PULSE time data recorder" produced by Briiel & Kjer (B&K).

Figure 12:
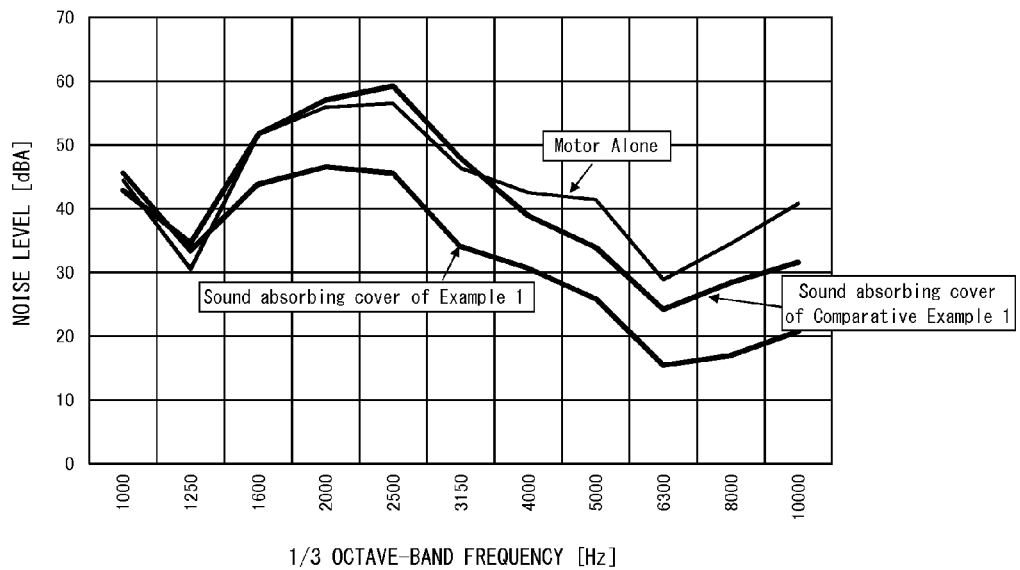
FIG. 12 is a graph showing results of measurement of a noise level of a motor.

FIG. 12 shows results of measurement of noise levels of the motor. FIG. 12 also shows, for comparison, a result of measurement of a noise level obtained when the motor around which the sound absorbing cover was not mounted was put into operation. As shown in FIG. 12, when the sound absorbing cover of Example 1 was mounted, the noise level remarkably decreased in almost all frequency regions, as compared with a case where the motor alone was measured. Meanwhile, when the sound absorbing cover of Comparative Example 1 assembled from an expanded shape to a box shape was mounted, a noise level decreased in a high-frequency region of 3500 Hz or more, but a noise level in a frequency region lower than 3500 Hz was almost the same as that obtained when the motor alone was measured. It was thus confirmed that the sound absorbing cover of Example 1 was excellent in sound absorbing property.

[Heat Radiation Property]

Figure 13:
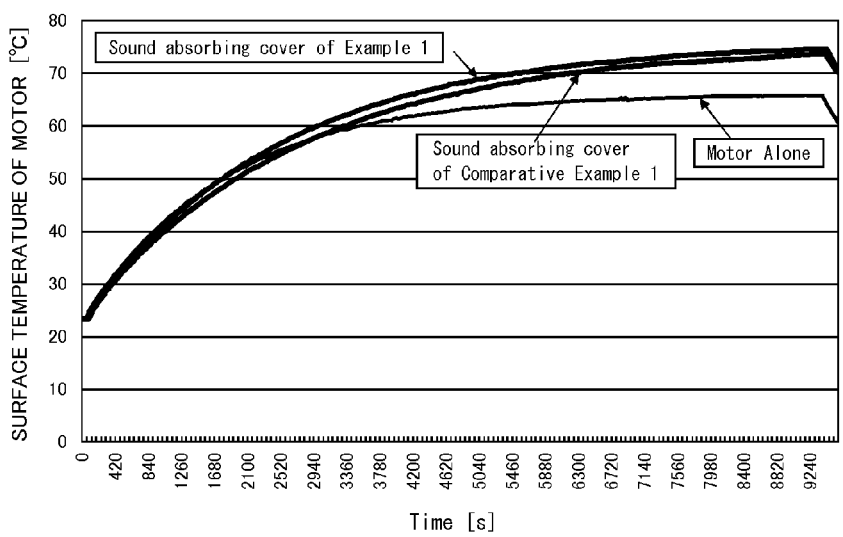
FIG. 13 is a graph showing how surface temperature of the motor changes with passage of time.

The heat radiation property of the sound absorbing cover was evaluated by measuring surface temperature of the motor during operation of the motor. The surface temperature of the motor was measured by attaching a thermocouple onto the bottom surface (rear surface) of the motor. FIG. 13 shows how the surface temperature of the motor changed with passage of time. FIG. 13 also shows, for comparison, how the surface temperature of the motor changed with passage of time when the motor around which the sound absorbing cover was not mounted was put into operation. As shown in FIG. 13, even when the sound absorbing cover of Example 1 was mounted, a rise in the surface temperature during operation of the motor was small as compared with the case where the motor alone was measured. It was thus confirmed that the sound absorbing cover of Example 1 was excellent in heat radiation property.

INDUSTRIAL APPLICABILITY

The sound absorbing cover and the sound absorbing assembly of the present invention can be used in a wide range of fields such as automobiles, electronic devices, and architecture. For example, the sound absorbing cover and the sound absorbing assembly of the present invention are suitably applicable to a sound absorbing material for an engine, a motor, an EGR valve, and other components placed in an engine compartment of a vehicle, a sound absorbing material for motors of office automation (OA) equipment and home electric appliances, a heat-radiating sound absorbing material for electronic devices such as personal computers, and other apparatuses.

The invention claimed is:

1. A sound absorbing cover that is made of foam containing magnetic filler, the sound absorbing cover comprising:
    a side wall that covers side surfaces of a mating member that is a noise source and
    a bottom wall that covers a bottom surface of the mating member that intersects with the side surfaces of the mating member, wherein
    the sound absorbing cover has a three-dimensional shape for covering the side surfaces and the bottom surface of the mating member,
    the sound absorbing cover is integrally molded in the three-dimensional shape by using a molding die that defines a concaved cavity inside and includes a first magnet disposed at a center of the cavity and having a rod shape and a second magnet disposed in a peripheral portion and a bottom portion of the cavity, and by injecting a mixed raw material containing a foam resin raw material and the magnetic filler into the cavity and performing foam molding while lines of magnetic force are generated between the first magnet and the second magnet, and
    the magnetic filler is oriented in the thickness direction of each of the side wall and the bottom wall.

2. The sound absorbing cover according to claim 1, wherein
    at least a part of each of the side wall and the bottom wall is disposed so as to be in contact with any of the side surfaces and the bottom surface of the mating member.

3. The sound absorbing cover according to claim 1, wherein
    one or both of the side wall and the bottom wall has a thinner portion.

4. A sound absorbing assembly characterized by comprising:
    the sound absorbing cover as claimed in claim 1; and
    a fixing cover that is attached to an outer peripheral surface of the sound absorbing cover and that fixes, to a base, the sound absorbing cover and the mating member that is a noise source covered by the sound absorbing cover.

5. The sound absorbing assembly according to claim 4, wherein
    the fixing cover includes a body in which the sound absorbing cover and the mating member are housed and a leg fixed to the base; and
    the sound absorbing cover and the mating member are supported so as to be spaced by the length of the leg from the base.

6. A magnetic induction foam molding device for producing the sound absorbing cover as claimed in claim 1, comprising:
    the molding die that defines the concaved cavity inside and includes the first magnet and the second magnet, wherein
    the magnetic induction foam molding device injects the mixed raw material containing the foam resin raw material and the magnetic filler into the cavity, and performs the foam molding while the lines of magnetic force are generated between the first magnet and the second magnet.

* * * * *